United States Patent [19]

Angona et al.

[11] Patent Number: 4,649,525
[45] Date of Patent: Mar. 10, 1987

[54] SHEAR WAVE ACOUSTIC LOGGING SYSTEM

[75] Inventors: Frank A. Angona; Joseph Zemanek, Jr., both of Dallas, Tex.

[73] Assignee: Mobil Oil Corporation, New York, N.Y.

[21] Appl. No.: 767,679

[22] Filed: Aug. 22, 1985

Related U.S. Application Data

[63] Continuation of Ser. No. 328,564, Dec. 8, 1981.

[51] Int. Cl.$^4$ .......................... G01V 1/40; H01L 41/08
[52] U.S. Cl. ......................................... 367/31; 367/75; 181/106; 310/333
[58] Field of Search ...................... 367/25, 31, 75, 169, 367/161, 912; 181/106; 310/330, 333, 334, 337, 368

[56] References Cited

U.S. PATENT DOCUMENTS

| | | | |
|---|---|---|---|
| Re. 25,413 | 7/1963 | Sogn | 310/368 |
| 2,281,778 | 5/1942 | Mason | 310/368 |
| 2,410,825 | 11/1946 | Lane | 310/332 |
| 3,054,915 | 9/1962 | Hauch | 310/368 |

FOREIGN PATENT DOCUMENTS 0031989  7/1980  European Pat. Off. .

OTHER PUBLICATIONS

Dix, "Seismic Prospecting for Oil", 1952, pp. 109–110, Harper & Bros.

Primary Examiner—Nelson Moskowitz
Attorney, Agent, or Firm—Alexander J. McKillop; Michael G. Gilman; George W. Hager, Jr.

[57] ABSTRACT

Acoustic well logging method and system employing a bender-type transducer as a point source of an acoustic shear wave. The bender-type transducer includes opposed unrestricted planar surfaces mounted within a liquid filled compartment within the tool. The unrestricted surfaces of the transducer are spaced longitudinally along the axis of the tool and exposed to the coupling liquid. One or more bender-type transducers may also be employed as acoustic receivers in the tools. The active surfaces of the receiving transducers are oriented in substantially the same direction as the active surfaces of the transmitting transducer.

3 Claims, 5 Drawing Figures

SHEAR WAVE ACOUSTIC LOGGING SYSTEM

This is a continuation of copending application Ser. No. 328,564, filed on Dec. 8, 1981.

BACKGROUND OF THE INVENTION

This invention relates to well logging and more particularly to well logging methods and systems employing bender-type transducers in shear wave logging.

It is a well known practice to survey a well by acoustic logging techniques in which acoustic signals are generated and received by means of a logging tool run through the well. One acoustic logging technique involves the generation and reception of acoustic pulses and the determination of the travel time of the pulse signals between a transmitter and receiver or between spaced receivers. By this technique the velocity of sound through a subterranean formation may be determined in order to characterize the formation. Another acoustic logging technique involves amplitude logging in which the loss of amplitude of an acoustic signal as it travels between a transmitter and receiver, or between spaced receivers, is measured. Velocity and amplitude logging may be carried out separately or in combination, that is the logging tool may be equipped with appropriate circuitry to detect both the travel time of the acoustic signal and the loss in amplitude.

An acoustic signal may be transmitted through a subterranean formation in both compressional and shear (transverse) modes. Since a shear wave cannot be transmitted along the borehole through liquid therein, it has been proposed to transmit and receive shear wave by transducers positioned in contact with the borehole wall. For example, U.S. Pat. No. 3,949,352 to Vogel discloses a shear wave acoustic logging system employing transmitting and receiving transducers spaced in close proximity with one another and located within a transducer mounting pad which is pressed against the wall of the borehole.

While the Vogel procedure requires a direct coupling of the transmitting and receiving transducers to the borehole wall, shear wave logging employing so-called "indirect" excitation of the borehole wall is disclosed in Kitsunezaki, "A New Method for Shear Wave Logging", OYO Tecnical Note, Urawa Research Institute, October, 1978. In this procedure an electromagnetic transducer is "suspended" in water (the borehole fluid) and employed to generate an asymmetric wave pulse (asymmetric acoustic radiation pattern) through the borehole fluid into the formation. The transducer is oriented such that an excitation bobbin vibrates along an axis normal to the axis of the well. The asymmetric radiation pattern in the fluid becomes a compressional wave and a shear wave at the formation fluid interface. The resulting shear wave travels through the formation and crosses the formation fluid interface at a location near receivers. When in the fluid, the shear wave becomes an asymmetric radiation pattern which is detected at a plurality of receivers spaced longitudinally from the transmitter. The receivers take the form of geophone type detectors in a detector body suspended in the borehole fluid and having an apparent density adjusted to be the same as the density of the borehole fluid.

SUMMARY OF THE INVENTION

In accordance with the present invention there is provided an acoustic well logging process and system utilizing a bender-type transducer for the generation of acoustic shear waves within the subterranean formation under investigation. Preferably bender-type transducers are employed for the detection as well as the generation of the acoustic shear wave signals. In carrying out the method of the invention a bender-type transducer is located in a liquid filled well penetrating the subterranean formation under investigation. The transducer has opposed unrestricted planar surfaces which are oriented along the axis of the well in order to generate the acoustic signal. The transducer is excited to simultaneously flex the opposed surfaces in a conforming manner in order to generate an asymmetric acoustic signal or asymmetric acoustic radiation pattern comprised of a positive pressure wave in one direction and a simultaneous negative pressure wave in the opposite direction. This signal is transmitted through the borehole liquid to the adjoining formation and then detected at a location spaced longitudinally along the wall from the transmitter.

The logging system of the present invention comprises an elongated logging tool adapted to be inserted into a borehole and means within the logging tool forming a compartment containing a coupling liquid. An acoustic transmitter is mounted in the tool. The transmitter comprises a bender-type transducer located in the compartment and having opposed unrestricted planar surfaces oriented along the longitudinal axis of the tool and exposed to the coupling liquid. Means are also provided for exciting the transmitter to simultaneously flex the opposed surfaces in a conforming manner and generate an asymmetric acoustic signal or asymmetric acoustic radiation pattern as described above. The logging tool also comprises an acoustic receiver mounted in the tool at a location spaced longitudinally from the transmitter. Preferably the receiver is also a bender-type transducer mounted in a liquid filled compartment and having opposed unrestricted planar surfaces exposed to the liquid within the compartment and oriented in substantially the same direction as the transmitter.

DESCRIPTION OF SPECIFIC EMBODIMENTS

Figure 1:
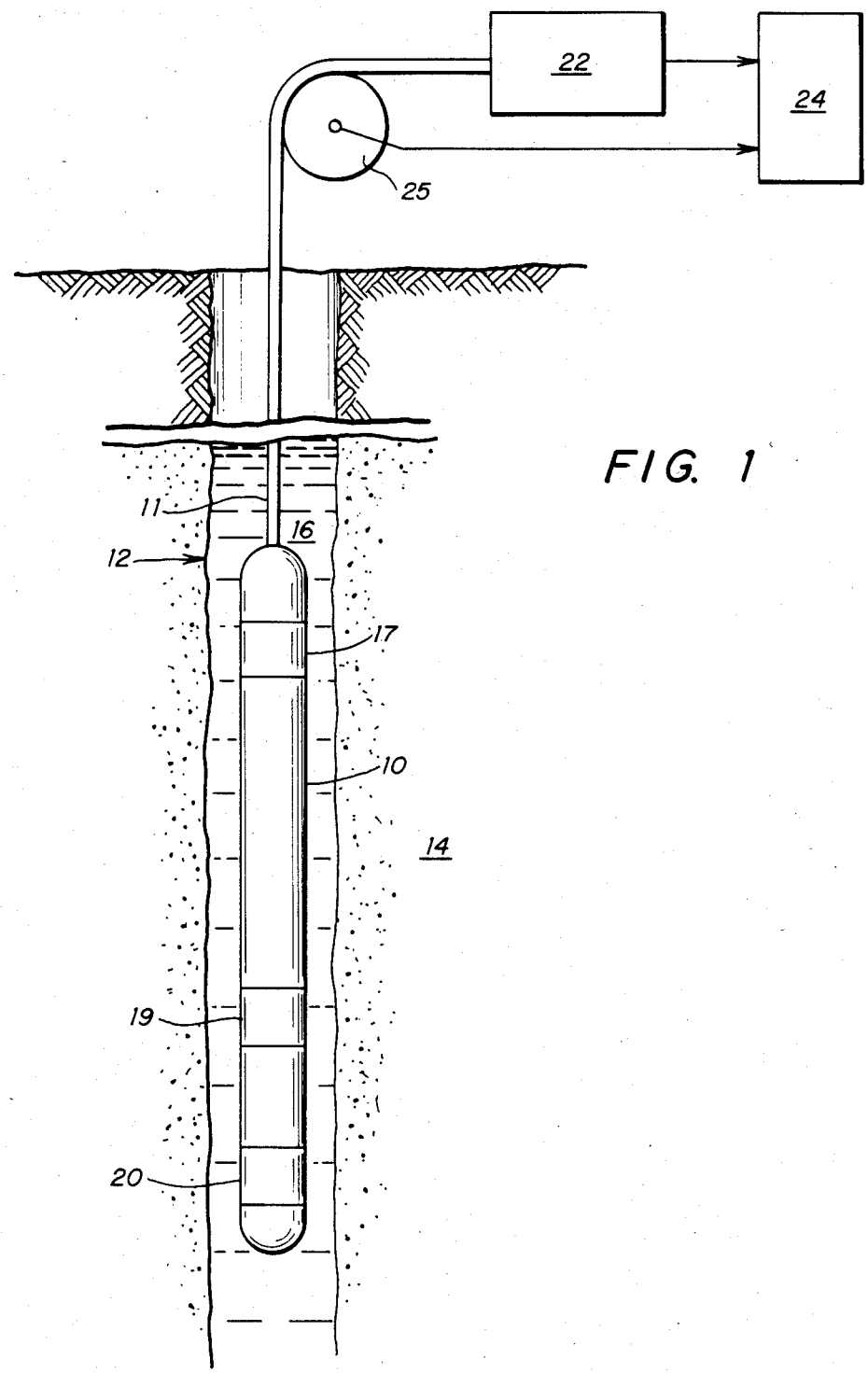
FIG. 1 is a schematic illustration of an acoustic logging system embodying the present invention.

Turning first to FIG. 1, there is illustrated an acoustic logging system embodying an improved logging tool of the present invention. The logging system includes an elongated logging tool 10 which is suspended from a cable 11 within a borehole 12 which traverses a subterranean formation of interest indicated by reference character 14. Formation 14 may be a suspected oil or gas bearing formation which is to be characterized in regard to its porosity, fluid saturation, or such other information as may be desired. The well 12 is filled with a liquid such as drilling mud indicated by reference numeral 16. The logging tool 10 comprises an acoustic transmitter 17 and acoustic receivers 19 and 20. Transmitter 17 and preferably also receivers 19 and 20 take the form of bender-type transducers as described in greater detail hereinafter.

Signals from the logging tool 10 are transmitted uphole by the conductors in cable 11 to any suitable utilization system at the surface. For example, the utilization system is illustrated as comprising an uphole analysis and control circuit 22 and recorder 24 in order that the output from circuit 22 may be correlated with depth.

The logging system may be operated in a manner to measure one or more parameters ascertainable with acoustic well logging systems. For example, the system may be operated in a velocity and/or amplitude logging mode as described previously. The transmitter and receivers are controlled through suitable timing circuitry located either uphole, or in the logging tool itself. Typically, the control circuitry will comprise a time base generator which operates to produce pulses to excite transmitter 17 and which gates receivers 19 and 20. The electrical pulses produced by the time base generator are preferably voltage spikes, that is, voltage pulses of relatively high amplitude and short duration whose frequency spectrum is extremely broad. Energizing acoustic transmitter 17 by voltage spikes cause the piezoelectric crystals (see FIGS. 2 and 2A) to resonate at a frequency determined by the dimensions of the crystal as will be explained infra. For example, the time base generator may generate a train of triggering pulses which produce a pulse repetition rate from the transmitter 17 of 15 acoustic pulses per second. Receivers 19 and 20 may be gated alternatively in order to prevent cross feed within the cable 11 as will be readily recognized by those skilled in the arts. For example, receiver 19 may be gated on during an interval of from 0.5 to 30 milliseconds subsequent to a first acoustic pulse from transmitter 17. Receiver 19 is then gated off and after the next succeeding pulse from transmitter 17, receiver 20 gated on. For example, receiver 20 may be gated on during a similar interval from 0.5 to 30 milliseconds subsequent to the transmitter output pulse. The logging tool may be moved through the well at any suitble rate while it is operated to generate and receive the acoustic pulses. Typically the tool will be lowered to the bottom of the interval to be logged and then pulled upwardly during the logging measurements at a speed of at least 20 feet per minute. Somewhat greater logging speeds, e.g. 60 feet per minute, normally can be used.

At the surface, the uphole circuitry operates on the signals from receivers 19 and 20 to produce signals representative of the travel time between receivers 19 and 20 and the difference in amplitude between the acoustic signals detected by receivers 19 and 20. The circuitry employed for determining the time interval between the acoustic signal arrival at receivers at 19 and 20 may be of any suitable type. For example, the pulses employed to trigger the transmitter may also be applied to a ramp function generator to initiate a signal which increases monotonically with time. For example, the ramp function generator may respond to a triggering pulse to generate a voltage which increases linearly with time. Thus, the amplitude of the voltage is directly proportional to the time following generation of the acoustic signal by transmitter 17. The output from the ramp function generator is applied through gates controlled by the outputs from receivers 19 and 20 to respective voltage storage means. Thus, when an acoustic signal is received at receiver 19, the resulting transducer voltage is applied to open one gate to pass the voltage from the ramp function generator to a first storage means. When the next signal is received by receiver 20, the transducer signal is applied to open another gate to pass the output from the ramp function generator to a second storage means. The two voltage signals are then applied to a difference circuit, the output of which is recorded in correlation with depth to provide a travel time log. The amplitude parameter may similarly be determined through the use of any suitable circuitry. For example, the peak voltage outputs from receivers 19 and 20 may be applied to a difference circuit which produces a voltage which is representative of the difference in the maximum amplitudes of the acoustic signals received by receivers 19 and 20. The output from this difference circuit is then recorded to provide a log of attenuation within the formation. Such analysis and control circuitry is well known to those skilled in the art and for a further description thereof reference is made to U.S. Pat. No. 3,191,145 to Summers. Also, while two receivers are shown it will also be recognized that the logging tool may be equipped with only one receiver in which case a measured parameter may be the travel time between transmitter 17 and the receiver. Preferably however, two receivers as shown will be employed in order to avoid distortion of the measured values due to borehole effects such as changes in the borehole diameter. Typically, the first receiver 19 is spaced about 5 to 15 feet from the transmitter with a spacing between adjacent receivers 19 to 20 of about 2 to about 5 feet.

As noted previously, shear wave acoustic pulses are produced in accordance with the present invention by means of a bender-type transducer. Bender-type transducers are in themselves well known and take the form of an element which responds to an applied electrical field such that its opposed surfaces bend in the same direction in a conforming manner. Thus, the transducer acts as a point source for an acoustic shear wave signal which may be characterized as comprising a positive pressure wave generated in one direction from one surface and a simultaneous negative pressure wave generated in the opposite direction from the other surface. For example, as described by Sheridan, C. A., et al, "Bender Bar Transducers For Low-Frequency Underwater Sound Sources", presented at the 97th Meeting of the Acoustical Society of America, Cambridge, Mass., June 15, 1979, Honeywell Defense Electronics Division, Seattle, Wash., Aug. 20, 1979, a suitable bender-type transducer may take the form of piezoelectric elements bonded together in a manner such that one side of the transducer is driven in extension while the other side is driven in contraction or is not driven. The result is that both sides of the transducer then bend in a conforming manner in response to an applied voltage. A suitable bender-type transducer for use in the present invention is commercially available and is comprised of two piezoelectric discs which are bonded together and encased in a plastic "potting" compound. The two ceramic discs are reversed in polarity such that one element responds to an applied voltage to expand while the other contracts. The result is that the element flexes in response to each voltage pulse such that one surface is concave and the other is convex. The frequency of the acoustic signal produced by this transducer ranges from about 1 to 6 kHz with a predominant frequency of about 3 KHz.

Figure 2:
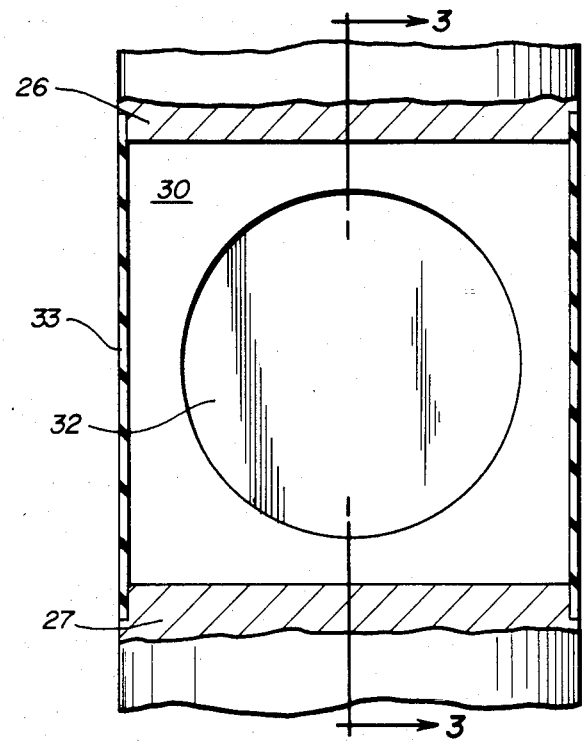
FIG. 2 is an illustration partly in section showing details of a portion of the tool shown in FIG. 1.
Figure 3:
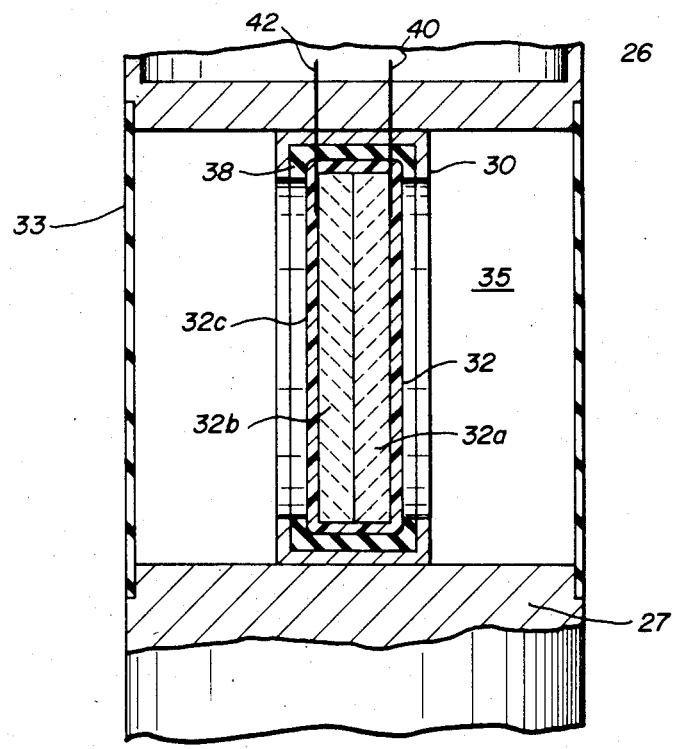
FIG. 3 is a sectional view taken along line 3—3 of FIG. 2.

In the present invention, the transducer is mounted such that the opposed flexing surfaces are unrestricted and both are acoustically coupled to the liquid within the wellbore. Turning now to FIGS. 2 and 3, there is illustrated an enlrged view of the transmitter assembly 17 showing in detail the bender-type transducer and the manner in which it is supported within the logging tool. As shown in FIG. 2, upper and lower panels 26 and 27, respectively, define a transducer compartment within the logging tool. Extending between the panels 26 and 27 is a transducer mounting bracket 30 which has an aperture therein which receives the bender-type transducer 32. The transducer compartment is provided with a peripheral window 33 which is relatively transparent to acoustic energy. The window 33 may be formed of any suitable material which has an acoustic impedance close to that of the well liquid in order to minimize reflections from the window. The transducer compartment is filled with a suitable coupling liquid as indicated by reference numeral 35 in FIG. 3 which also has an acoustic impedance close to that of the liquid within the wellbore. For example, the window 33 may be formed of neoprene rubber and the coupling liquid 35 within the compartment may be a light motor oil.

The mounting of the bender-type transducer 32 is shown in greater detail in FIG. 3. As shown in FIG. 3, the transducer 32 comprises piezoelectric elements 32a and 32b which are bonded together and encased in a plastic potting compound 32c. The transducer 32 is mounted in support 30 by means of a rubber mounting ring 38 in order to reduce the transmission of acoustic energy directly from the transducer to the structural components of the well logging tool. Electrical leads 40 and 42 are bonded to the outer surfaces of elements 32a ad 32b, respectively. Leads 40 and 42 extend through panel 26 to a suitable source for a voltage pulse such as a capacitor and inductor circuit which is periodically charged and then discharged in response to a suitable triggering pulse as described above.

The bender-type transducer acts as a single point acoustic source and ideally produces a shear wave displacement and radiation pattern of the type disclosed in the aforementioned article by Kitsunezaki. The shear wave amplitude is at a maximum in the plane of the operating faces of the bender-type transducer and falls off as a cosine function until it reaches a minimum after displacement through an angle of 90°. The compressional wave pattern is 90° out of phase with respect to the shear wave. Thus the compressional wave amplitude is at its maximum along an axis normal to the operating surfaces of the bender-type transducer.

The receiver transducer or transducers may, in accordance with the broadest aspect of the invention, be of any suitable type. For example, they may take the form of a suspension-type geophone detector of the type disclosed in the paper by Kitsunezaki. It is preferred, however, to employ a bender-type transducer.

To achieve lower resonant frequencies, the length must be increased. A resonant frequency of 1 KHz requires a length or diameter of approximately six inches, which is much too large to be mounted within a logging tool for use in a well borehole having a radial distance of approximately three inches.

Figure 2A:
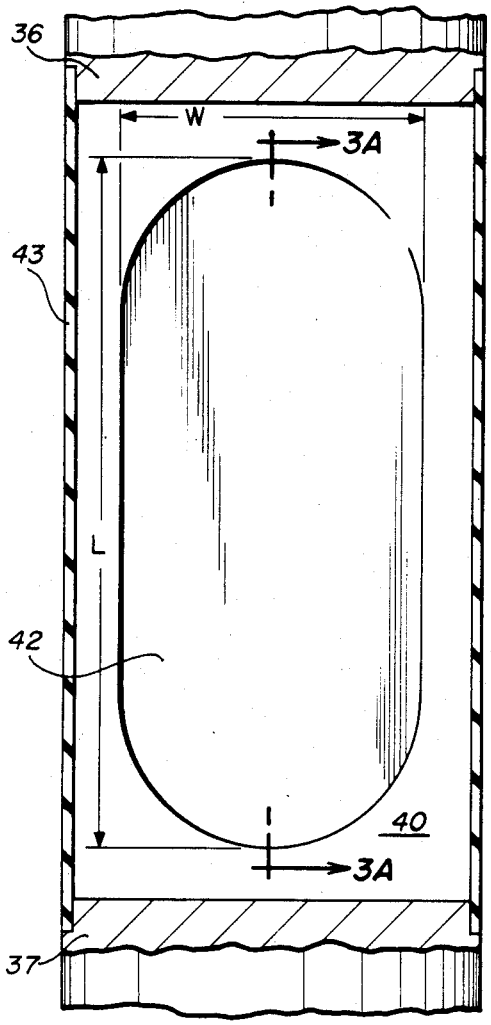
FIG. 2A is an illustration of an alternate embodiment of FIG. 2.
Figure 3A:
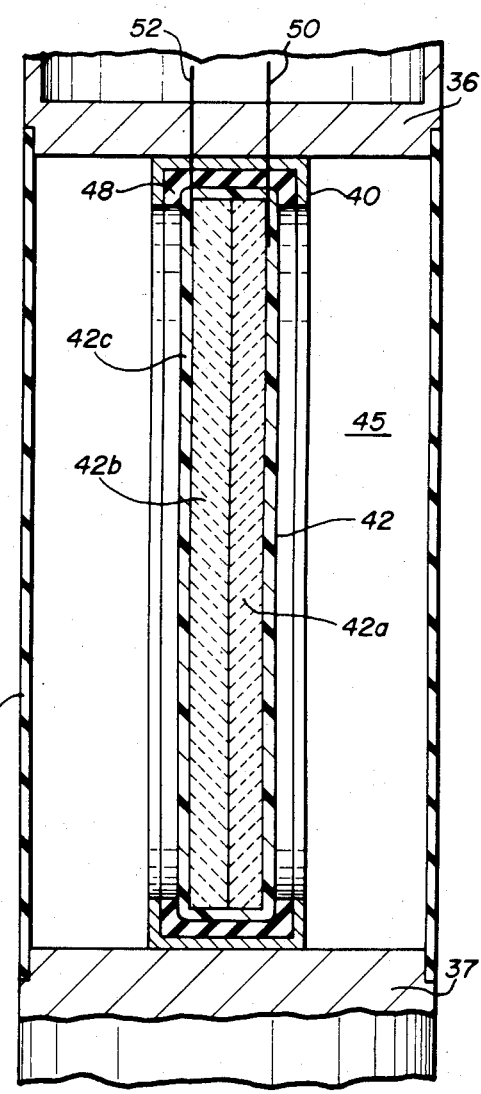
FIG. 3A is a sectional view taken along line 3A—3A of FIG. 2A.

Turning now to FIGS. 2A and 3A, there is illustrated an enlarged view of the transmitter assembly 17 illustrating in detail an alternate arrangement of the bender-type transducer and the manner in which it is supported within the logging tool. As shown in FIG. 2A, upper and lower panels 36 and 37, respectively, define a transducer compartment with the logging tool. Extending between the panels 36 and 37 is a transducer mounting bracket 40 which has an aperture therein which receives the bender-type transducer 42. The transducer compartment is provided with a peripheral window 43 which is relatively transparent to acoustic energy. The window 43 may be formed of any suitable material which has an acoustic impedance close to that of the well liquid in order to minimize reflections from the window. The transducer compartment is filled with a suitable coupling liquid as indicated by reference numeral 45 in FIG. 3A which also has an acoustic impedance close to that of the liquid within the wellbore. For example, the window 43 may be formed of neoprene rubber and the coupling liquid 45 within the compartment may be a light motor oil.

The mounting of the bender-type transducer 42 is shown in greater detail in FIG. 3A. As shown in FIG. 3A, the transducer 42 comprises piezoelectric elements 42A and 42B which are bonded together and encased in a plastic potting compound 42C. In accordance with the preferred embodiment, the length, L, of the piezoelectric planar surface or direction parallel to the center axis of the logging tool is approximately three times greater than its width, W, or direction perpendicular to the center axis of the logging tool. The transducer 42 is mounted in support 40 by means of a rubber mounting ring 48 in order to reduce the transmission of acoustic energy directly from the transducer to the structural components of the well logging tool. Electrical leads 50 and 52 are bonded to the outer surfaces of elements 42A and 42B, respectively. Leads 50 and 52 extend through panel 36 to a suitable source for a voltage pulse such as a capacitor and inductor circuit which is periodically charged and then discharged in response to a suitable triggering pulse as described above.

The bender-type transducer described in the preferred embodiment acts as a single point acoustic source and ideally produces a shear wave displacement and radiation pattern of the type disclosed in the aforementioned article by Kitsunezaki. The shear wave amplitude is at a maximum in the plane of the operating faces of the bender-type transducer and falls off as a cosine function until it reaches a minimum after displacement through an angle of 90°. The compressional wave pattern is 90° out of phase with respect to the shear wave. Thus the compressional wave amplitude is at its maximum along an axis normal to the operating surfaces of the bender-type transducer.

The receiving transducer or transducers may, in accordance with the broadest aspect of the invention, be of any suitable type. For example, they may take the form of a suspension-type geophone detector of the type disclosed in the paper by Kitsunezaki. It is preferred, however, to employ a bender-type transducer for the reception of the acoustic signal and to orient the receiving transducer such that its opposed operating surfaces are oriented in substantially the same direction as the transmitting transducer. Stated otherwise, the operating surfaces of the transmitting and receiving transducers are located in substantially parallel planes. Since the displacement pattern of the shear wave is a cosine function, some deviation from this standard can be tolerated and still provide a signal response well over 90% of the maximum shear wave amplitude. Where two receiving transducers are employed, both of the receivers should be oriented in the same direction, particularly where the system is operated in an amplitude logging mode, i.e. where attenuation of the signal between the receivers is arrived at by comparing the amplitudes of the signals received at the receivers.

We claim:

1. In the acoustic logging of a liquid-filled well penetrating a subterranean formation, the method comprising:
   (a) lowering within said well a well logging tool having a bender-type first transducer with opposed unrestricted piezoelectric planar surfaces oriented along the axis of said logging tool;
   (b) locating within said logging tool at least one second transducer spaced longitudinally along said logging tool from said first transducer;
   (c) continuously pulling said logging tool upwardly through said well;
   (d) exciting said bender-type first transducer while it is being pulled through said well by applying voltage spikes at a select repetition rate to said opposed planar surfaces to cause said opposed planar surfaces to resonate in response to each said voltage spike and thereby generate in said liquid-filled well repetitive, asymmetric acoustic radiation patterns, each comprised of a positive pressure wave in one direction and a simultaneous negative pressure wave in the opposite direction, said asymmetric radiation patterns being converted to shear waves at the interface between said well and the formation surrounding the well; and
   (e) monitoring the travel of said shear waves through said formation between said first transducer and said second transducer by detecting at said second transducer the asymmetric radiation patterns produced within the liquid-filled well as said shear waves leave said formation and re-enter said well adjacent the spaced-apart location along said logging tool of said second transducer.

2. The method of claim 1 wherein said logging tool is pulled upwardly in said well at a rate of at least 20 feet per minute.

3. The method of claim 2, wherein said voltage spikes have a repetition rate to produce in the order of 15 resonances per second from said bender-type first transducer.

* * * * *